US007801914B2

(12) United States Patent
Greene et al.

(10) Patent No.: US 7,801,914 B2
(45) Date of Patent: Sep. 21, 2010

(54) SYSTEM, METHOD AND COMPUTER-PROGRAM PRODUCT FOR ALLOWING AN ENTITY TO CAPTURE, INTEGRATE, AND REPORT DESIRED INFORMATION RELATING TO A SPECIFIC SITUATION IN A GIVEN PROCESS-RELATED WORK ENVIRONMENT

(75) Inventors: Scott R. Greene, Defiance, MO (US); James M. Milstead, Madison, AL (US)

(73) Assignee: The Boeing Company, Chicago, IL (US)

( * ) Notice: Subject to any disclaimer, the term of this patent is extended or adjusted under 35 U.S.C. 154(b) by 484 days.

(21) Appl. No.: 11/194,018

(22) Filed: Jul. 29, 2005

(65) Prior Publication Data

US 2006/0026151 A1 Feb. 2, 2006

Related U.S. Application Data

(60) Provisional application No. 60/592,904, filed on Jul. 30, 2004.

(51) Int. Cl.
*G06F 17/00* (2006.01)
(52) U.S. Cl. .................................. 707/779; 707/803
(58) Field of Classification Search ................ 707/102, 707/779, 803
See application file for complete search history.

(56) References Cited

U.S. PATENT DOCUMENTS

| 6,834,285 | B1 * | 12/2004 | Boris et al. | 1/1 |
|---|---|---|---|---|
| 2003/0182391 | A1 * | 9/2003 | Leber et al. | 709/217 |
| 2003/0204449 | A1 * | 10/2003 | Kotas et al. | 705/27 |
| 2004/0128613 | A1 * | 7/2004 | Sinisi | 715/500 |
| 2004/0139400 | A1 * | 7/2004 | Allam et al. | 715/526 |
| 2004/0260634 | A1 * | 12/2004 | King et al. | 705/35 |
| 2005/0033715 | A1 * | 2/2005 | Suda et al. | 707/1 |

* cited by examiner

*Primary Examiner*—James Trujillo
*Assistant Examiner*—Fatima P Mina
(74) *Attorney, Agent, or Firm*—Yee & Associates, P.C.; John A. Lepore

(57) ABSTRACT

Methods and systems are provided for collecting desired information from information that relates to a specific situation within the context of a specific work environment, wherein the information comprises extraneous information and the desired information. A template that relates to the specific situation can be opened and interpreted at a computing device to generate queries presented to a user for extracting the desired information from the information. A user can input responses to the queries, and a completed template can be generated based on the responses. The completed template includes the desired information. The completed template can be submitted to an information management system.

13 Claims, 4 Drawing Sheets

SYSTEM, METHOD AND COMPUTER-PROGRAM PRODUCT FOR ALLOWING AN ENTITY TO CAPTURE, INTEGRATE, AND REPORT DESIRED INFORMATION RELATING TO A SPECIFIC SITUATION IN A GIVEN PROCESS-RELATED WORK ENVIRONMENT

CROSS-REFERENCE TO RELATED APPLICATION

This application claims the benefit of U.S. Provisional Application No. 60/592,904, filed Jul. 30, 2004.

TECHNICAL FIELD

The present invention generally relates to information collection in the context of a specific work environment.

BACKGROUND

In certain work environments, a user often serves as a point of integration within a complex analysis project which involves information collection and reporting of the collected information. FIG. 1 is a flow chart showing a conventional information collection process. Conventionally, during an information collection process, a user encounters a situation that includes a large amount of information. At step 2, the user analyzes the situation and at step 4 determines which pieces of information are appropriate or relevant to the specific situation (e.g., a specific task in a specific work environment). In other words, the user extracts what they perceive to be the relevant or appropriate information and attempts to minimize any extraneous information. At step 6, the user locally records this appropriate or relevant information. After a time delay at step 8, the user collects and analyzes additional, related enterprise information from other sources which may comprise information or data records relating to the specific situation and/or task the user encounters in a given work environment. These records can also be based on who the specific user is and/or what the specific user is working on. For example, the records might include personal records, statistics, quality records, defect records, status records, timing information, date information, historical information, configuration information, design information, survey information, audit information, inventory information, and identification information. The user then reports information he/she deems relevant into the computer at step 10. At step 12, the computer communicates the information to a database which stores this information as a "report." The database can be part of a system sometimes referred to as an information management system (IMS). Of the total information available in a particular situation, only certain "desired" information is relevant or appropriate to resolve that particular situation and should be included in the report. The desired information can include, for example, findings, recommendations or conclusions used to characterize, disposition, resolve or fix a specific, particular situation. However, an ideal report should not include extraneous information that is unnecessary or irrelevant to characterize, disposition, resolve or fix the specific, particular situation. This desired information generated by the user can then be used to help track and understand the information.

One example of an information collection process might take place, for example, in the context of a problem identification and reporting process. In a particular work environment, a user, such as an inspector or other worker, might traditionally encounter a work situation that involves a specific problem. The user typically analyzes the problem and extracts what they believe to be appropriate information to characterize and/or potentially solve the problem. The user typically takes handwritten notes which describe their findings, recommendations or conclusions regarding the problem, and then transfers their notes to a computer system at a later time. In many cases the user's work environment often prevents the user from recording the information in the IMS immediately. Before entering the information into an IMS, many users also need to do subsequent research that is helpful in characterizing the problem or in generating their conclusions. At a later time the user or another person can enter the problem information into a problem management system (PMS) that resides in an IMS.

For example, one industry that has traditionally relied on manual methods of collecting data and recording it for future use is the aircraft manufacturing, modification and maintenance industry. In this work environment, aircraft inspectors would traditionally take handwritten notes of defects or non-conformance problems while inspecting an aircraft and then, at a later time, research fault criteria and part numbers and file a report by manually typing their notes into a problem management system (PMS) maintained on a remote computer in another location.

Such information collection processes are inefficient and can result in duplication of effort since an intermediate step takes place between identifying the problem and entering it into the problem reporting system. As such, these processes can often result in large delays or cycle times which arise during the time elapsed between analyzing and identifying the information, recording the relevant information on paper, and subsequently logging it into the IMS.

Portable personal computers (PCs) and wireless networking technologies have enabled point-of-use information collection technologies. Using the computers to collect information along with wireless networking technologies can allow a user to simultaneously collect and record the collected information in an IMS connected to the network. To make the process of collecting information even more efficient, free-form computer processes can use a simple form to standardize reporting of any information encountered within the specific work environment. Users can be provided with these standard, generalized forms over a user interface on the computer. The users can record information they deem to be appropriate or relevant on a form and then submit the completed form to an IMS.

Standardized forms can often result in incomplete or erroneous recording of the information. These standardized forms do not adapt or correspond to particular situations within a work environment, and are not designed to extract particular "desired" information that might be helpful in resolving the specific situation. In many cases an individual may fail to include some of the "desired" information required in a specific situation.

Standardized forms are also plagued by inconsistent information entry. Information deemed relevant in a particular situation to one user may vary greatly from that deemed relevant by another user. Because the actual description of the information is left up to the individual recording the information into the form, this can result in vast differences with respect to the manner in which information is reported. Free-form text entered by individual users tends to vary depending on the user, time of day, etc. As such, the information that is eventually reported can vary on a case-by-case or user-by-user basis. For instance, when different users record similar information, the particular information they choose to provide or the words they use to describe that information can vary significantly. Moreover, information recorded by a single user can also vary significantly each time that user records the same information since the same user might record the same information differently at different times.

Standardized forms are also susceptible to entry of undesired information and to user errors. For example, users might enter extraneous information that is unnecessary, inappropriate or irrelevant and not useful in the specific, particular situation that exists within the context of the particular work environment.

Notwithstanding these advances, there is a need for improved information collection techniques which can help ensure that a user collects all of the relevant or desired information needed to report a particular situation in a specific work environment without collecting extraneous information. These techniques should help ensure that the collected information is reported in a consistent manner regardless of the user. The information reported or recorded should not tend to vary on a case-by-case or user-by-user basis. The recorded information should include all information needed to report a particular situation in the context of that situation. Such techniques should also help to reduce errors in recording of the information, and allow the reported information to be posted quickly into an IMS. Other desirable features and characteristics of the present invention will become apparent from the subsequent detailed description and the appended claims, taken in conjunction with the accompanying drawings and the foregoing technical field and background.

BRIEF SUMMARY

Methods and systems are provided for collecting desired information within the context of a specific work environment. Desired information refers to context-sensitive information which includes findings, recommendations or conclusions used to characterize, disposition, resolve or fix a specific, particular situation, but that does not include extraneous information that is unnecessary or irrelevant to characterize, disposition, resolve or fix that particular situation.

BRIEF DESCRIPTION OF THE DRAWINGS

The present invention will be described in conjunction with the following drawing in which like numerals denote like elements.

DETAILED DESCRIPTION

Figure 1:
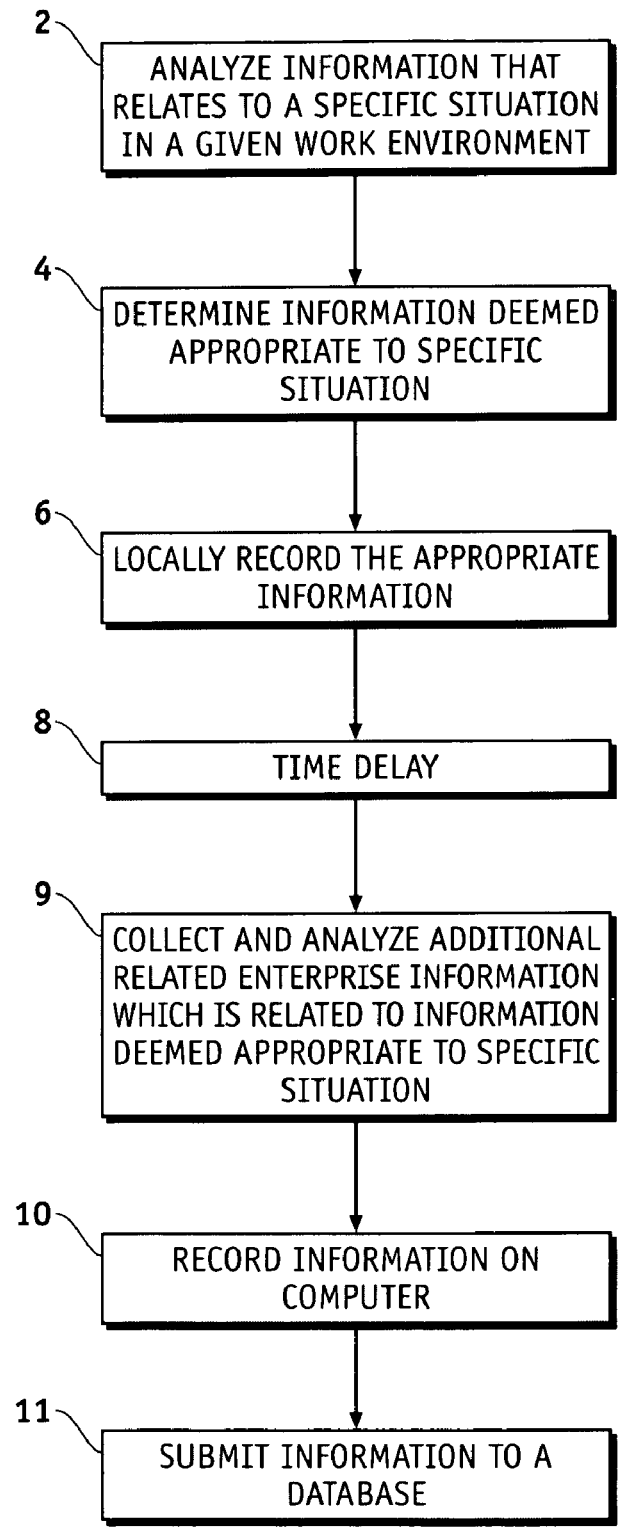
FIG. 1 is a flow chart showing a conventional information collection process.

The following detailed description is merely exemplary in nature and is not intended to limit the invention or the application and uses of the invention. Furthermore, there is no intention to be bound by any expressed or implied theory presented in the preceding technical field, background, brief summary or the following detailed description. The word "exemplary" is used exclusively herein to mean "serving as an example, instance, or illustration." Any embodiment described herein as "exemplary" is not necessarily to be construed as preferred or advantageous over other embodiments.

As used herein, the term "desired information" refers to context-sensitive information which includes findings, recommendations or conclusions used to characterize, disposition, resolve or fix a specific, particular situation, but does not include extraneous information that is unnecessary or irrelevant to characterize, disposition, resolve or fix the specific, particular situation. The desired information contained in reports generated in many work environments can be characterized by a high degree of repetition or redundancy. In some cases, the desired information in a particular situation has already been identified in a prior report.

Aspects of the present invention can provide flexible process-based techniques for improving information collection/management within the context of a user's work process. Generic process-based information collection systems and methods are provided that more efficiently capture information and yield reports than "form-based approaches." These techniques are "process-based" since the information collection process is matched to the user's work process and can therefore allow an enterprise to capture desired information in the context of that work process. For example, in one embodiment, the information can be collected using a template selected from a group of templates. The process matches this template to a specific task the user performs within a specific work environment. As such, the information collected is based on the context of that user's work environment and relates to that user's specific task in that specific work environment. These techniques can allow users to collect the "desired" information in a specific situation and help ensure that the information collected is consistent, valid and useful to the enterprise. The template reduces or eliminates the amount of potentially extraneous information that the user might otherwise be tempted to submit to the IMS. As such, even if the user deems certain information as being appropriate or relevant in a given situation, the template can be designed or structured to prevent entry of such information to the extent it is not "desired." The questions presented to the user are context sensitive depending on the particular information deemed important to the situation defined by the user. A work center design can be implemented which leverages historical data relating to the work process to increase the efficiency with which desired information is extracted from the work process.

To streamline the information collection process, software platforms for information collection can be provided which comprise custom software for use with computer hardware such as a portable "tablet" personal computer (PC). In one implementation, a portable computer can be used to collect the desired information within a template specific to a specific situation, and immediately post the completed template (collected information merged with template verbiage) into a database. The completed template serves as a report. These systems and methods can significantly reduce costs associated with collecting information in a work environment. The span or cycle time that exists between capturing information and reporting that information can also be significantly reduced. In addition, paper work associated with such processes can also be significantly reduced.

According to one aspect techniques and apparatus are provided which can help a user collect information and make correct decisions. In one implementation, the template and database work together to guide the user through the information collection process and make correct decisions during that information collection process. The templates help ensure that the desired information is captured in a consistent and repeatable manner which satisfies the data input requirements of a given business process for workers to accomplish a given task. The templates can also provide a mechanism for connecting to external data sources to provide data to the user which can assist them in providing the data required to complete a specific business process. Moreover, the desired information which is collected by the templates can be stored in a database. Once the system correctly guides the user to collect the desired information, this desired information which has been collected can be stored in a dynamically changing database to help future users during information collection tasks. The database allows others users to later leverage the collected information during collection of other information relating to the enterprise.

Figure 2:
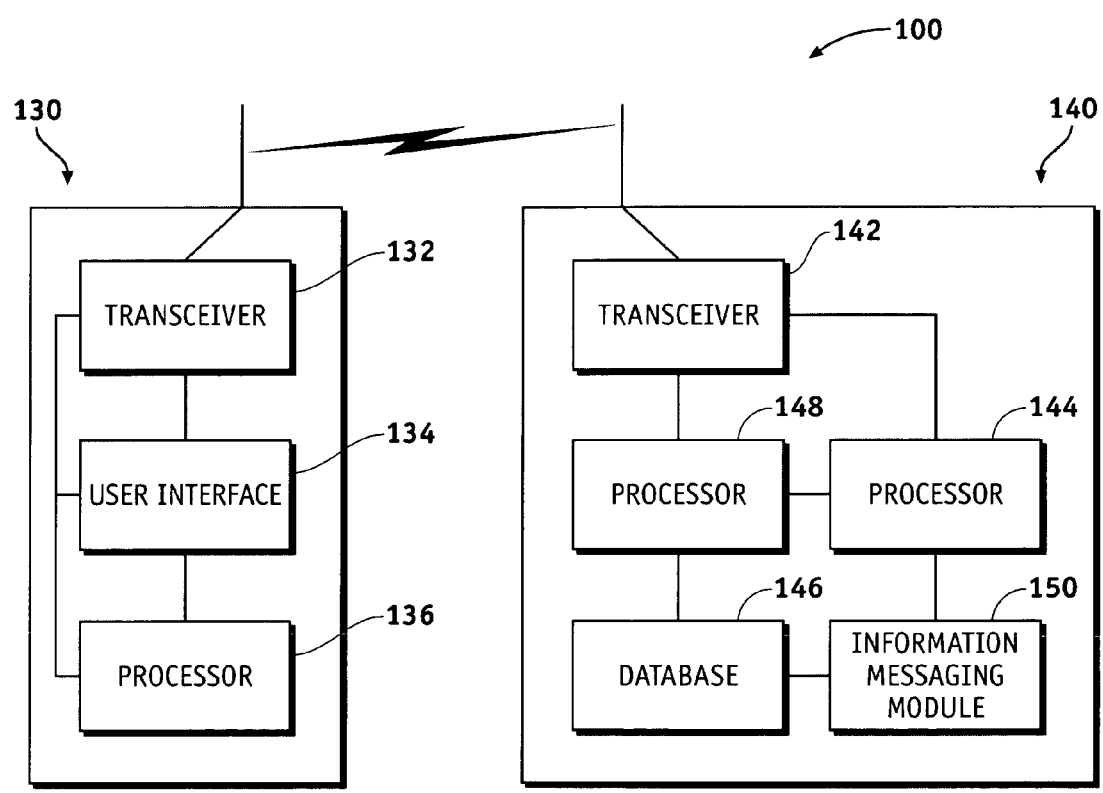
FIG. 2 is a block diagram of an exemplary system for collecting information.

FIG. 2 is a block diagram of an exemplary system 100 for collecting information which helps facilitate capturing desired, context-sensitive information during an information collection process.

This system can allow for collection desired information within the context of a specific work environment. The system 100 implements efficient process-based methods for improving information collection within the context of a specific work process. The system 100 can include, for example, a computing device 130 and an information management system 140 that communicates with the computing device 130 via a wireless network over a wireless link (shown as a lightening bolt). The wireless network can be, for example, a Local Area Network (LAN), a Wireless Area Network (WAN), a Wireless Local Area Network (WLAN) or similar wireless communication system such as a high data rate cellular system or a WiMAX system.

The computing device 130 can be any type of portable personal computer (PC) such as a tablet PC, a wireless handset, a personal digital assistant (PDA) or other types of mobile personal computers that can be used at different points-of-use within the specific work environment. The computing device may or may not be mobile and is capable of communicating within wireless and wired networks. In one embodiment, the computing device 130 can comprise a wireless-enabled handheld mobile computer. The computing device 130 can send signals to and receive signals from the IMS 140. The computing device 130 can include, for example, a transceiver 132, a user interface 134, and a processor 136.

The processor 136 is configured to interpret templates and generate queries presented to a user for extracting desired information. The processor 136 may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A user collects and records the desired information that relates to a specific situation at a point-of-use in a specific work environment, and inputs the information via the user interface 134. The user interface 134 presents the desired information to the user within the template.

The transceiver 132 is configured to communicate within the wireless network by transmitting and receiving information from an antenna which sends signals to and receives signals from the IMS 140. The transceiver 132, user interface 134 and processor 136 are coupled to one another to allow communication between them.

Each of the templates request user input via queries. The user inputs responses to each of the queries via an input unit of the user interface 134 to generate a completed template. The user eventually submits the completed template to the IMS 140 over the wireless link.

The IMS 140 can include a transceiver 142, a processor 144, a database 146, a processor 148 and an information messaging module 150. The information management system 140 communicates with the computing device 130 over the wireless link. The information messaging module may comprise, for example, a web service module, or any other device which can move information between the database 146 and the processor 144.

The transceiver 142 includes an antenna for communicating signals to and from the computing device 130, and is coupled to the processor 144 and the processor 148. The wireless transceiver 142 is configured to receive the information from the user and transmit that information to the IMS 140. The wireless transceiver 142 is also configured to receive the information from the IMS 140 and provide that information to the user via the user interface 134.

The processor 148 is also coupled to the processor 144 and the database 146. The processor 148 may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The database 146 is coupled between the processor 148 and the information messaging module 150. The database 146 may comprise, for example, a RAM memory, flash memory, ROM memory, EPROM memory, EEPROM memory, registers, hard disk, a removable disk, a CD-ROM, or any other form of storage medium. Once a user enters the desired information into its corresponding template, the information messaging module 150 communicates the desired information to the database 146. The database 146 is configured to store the desired information collected by and sent from the computing device 130. The database 146 is configured to store a plurality of templates as well as the completed templates or "reports" including the desired information.

The processor 144 receives the information from the user, and determines whether a template exists that relates to the specific situation. If a template exists that relates to the specific situation, the processor 144, operating in conjunction with the processor 148, selects the template that relates to the specific situation. The wireless transceiver 142 transmits the template to the transceiver 132 of the computing device 130 over the wireless link. Once the template is interpreted by the processor 136, it is displayed on the user interface 134 as a series of queries which request user input comprising the desired information.

The information messaging module 150 can be implemented in the IMS 140 and is configured to implement a set of information management processes based on business logic and workflow rules. In one embodiment, the information messaging module 150 can be implemented as a "rich internet application" which allows the user to make web service calls to business logic in machines. These machines may be distributed in the network or on the local computing device 130. Although FIG. 2 shows the information messaging module 150 as being coupled between the processor 144 and the database 146, it should be appreciated that the information messaging module 150 could be implemented in the processor 144, the information messaging module 150 or in the processor 136 of the computing device 130. The information messaging module 150 may reside in RAM memory, flash memory, ROM memory, EPROM memory, EEPROM memory, registers, hard disk, a removable disk, a CD-ROM, or any other form of storage medium. An exemplary storage medium is coupled to the processor 148 such that the processor 148 can read information from, and write information to, the storage medium. In one embodiment, the business logic and user interface 134 can be separate and templates are stored on a database as, for example, XML files. In another embodiment, the business logic can be incorporated within a local computing device 130. In the alternative, the storage medium may be integral to the processor 148. The processor 148 and the storage medium may reside in an ASIC within the computing device 130. In the alternative, the processor 148 and the storage medium may reside as discrete components in the computing device 130.

The information messaging module 150 can include a first web service application for tailoring a web service call to the specific situation and a second web service application module for authoring of new templates.

The first web service application can include, for example, a speech recognition module for processing speech input of the user, a handwriting recognition module for processing handwriting input of the user, and/or a software-based keyboard module for processing keypad input of the user. The first web service application can use a list of values in which each value corresponds to information associated with a particular context. Each value can be associated with a template included from a list of templates. The templates can be based on historical data compiled from prior reports, and can include prompts designed to extract desired information associated with a particular context in the specific work environment.

The second web service application module is used for authoring of new templates designed to extract desired information. The new template that is generated relates to the specific situation within a particular context in the specific work environment. In one embodiment, the user sends situation information to the IMS 140 relating to the specific situation. Based on the situation information the information messaging module 150 selects an existing template for a different situation which includes attributes similar to templates used in other situations which are similar to the specific situation. The processor 144 presents the existing template to the user allowing the user to alter the templates contents, thus creating a new template. The user uses the attributes of the existing template to generate the new template having queries for extracting the desired information for the specific situation.

Communication between the user interface 134 and the web service module 140 can be regulated according to a protocol which allows the user interface 134 to bind to the information messaging module 150 at run-time thereby allowing the user interface 134 to simultaneously connect to the first and second web service applications. The protocol may comprise, for example, a Simple Object Access Protocol (SOAP).

Figure 3:
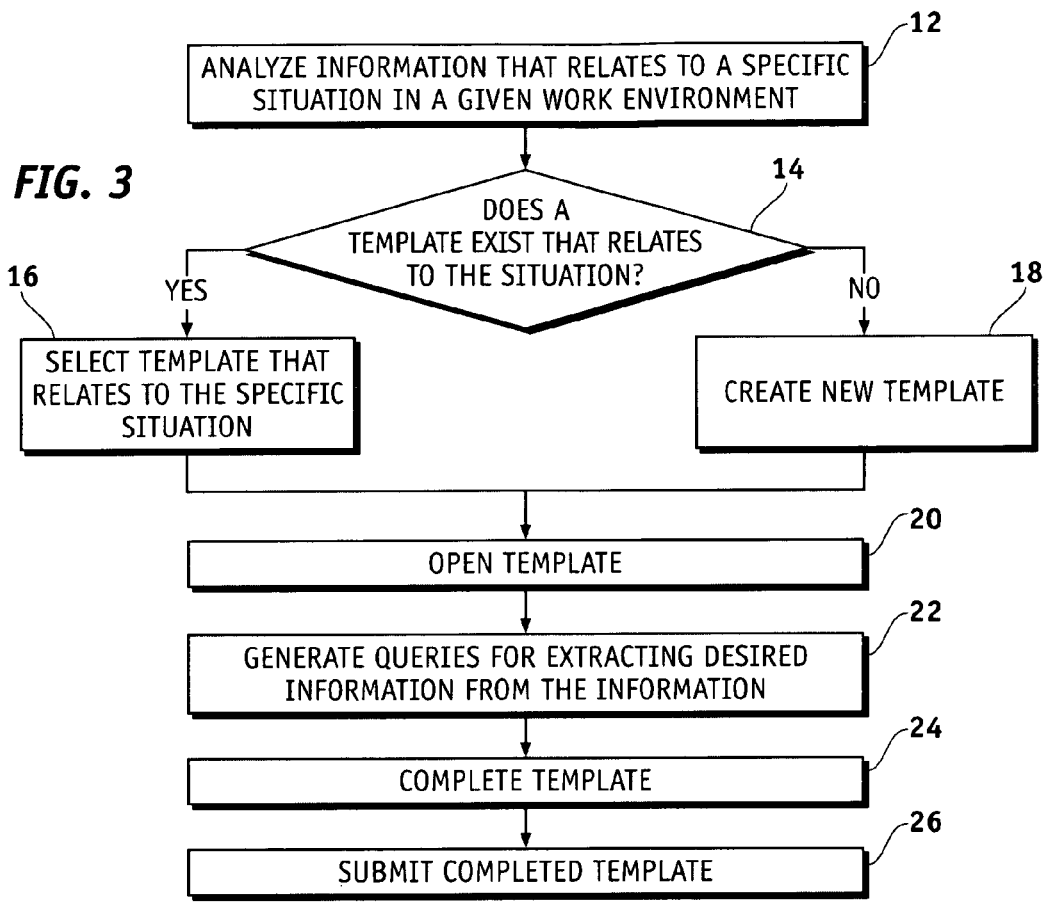
FIG. 3 is a flow chart that shows an information collection process according to an exemplary embodiment of the invention.

FIG. 3 is a flowchart illustrating an information collection process according to one exemplary embodiment which can allow desired information to be collected within the context of a specific work environment.

At step 12, information that relates to a specific situation in a specific work environment is analyzed. In one embodiment, a user who carries a portable computer observes a specific situation within a work environment. The information from the specific work environment comprises the desired information and extraneous information. The user decides which information is appropriate or relevant to the specific situation. The user analyzes the information to determine a category the information belongs to based on the context of the situation. In one embodiment, when these techniques are applied to a problem management system, the desired information comprises, for example, details which characterize or resolve a problem which occurs in the work environment.

At step 14, it is determined whether a template exists that relates to the specific situation. In one embodiment, the IMS 140 consults a template application to determine if a specific template is available to report desired information which relates to the specific situation. The specific template for that particular situation poses questions to the user which are designed to extract desired information based on the context of the situation. By using a template-based scheme that is designed for particular situations within a specific work environment, templates can be designed based on historical knowledge of the specific situation. By designing templates based on historical data collected for an existing problem, the IMS 140 can ensure that the desired information will be collected by asking questions based upon the collective knowledge of the enterprise. This also prevents collection of extraneous information. This process can eliminate redundant recording of a problem and in some cases can eliminate the need for a user to do research associated with a specific situation.

At step 16, if it is determined at step 14 that the template exists that relates to the specific situation, then the template can be selected. In one embodiment, the IMS 140 can forward that template or a list of templates to the computing device 130 based on the selected category. As used herein, a "category" can be a unit of information which relates to the given work environment. If an existing template is listed that relates to the specific situation and implements a specific business process, then the user can select that template.

Figure 4:
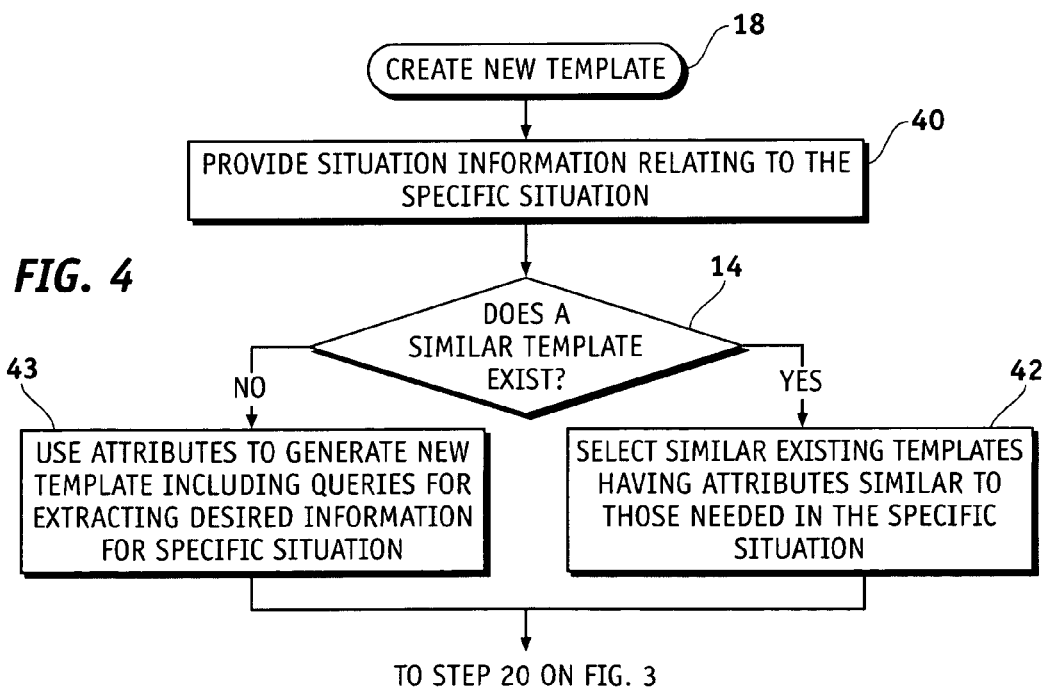
FIG. 4 is a flowchart that shows an example of a process for creating a new template.

If a template does not exist that relates to the specific situation, then at step 18, a new template can be created that relates to the specific situation and that includes queries designed to extract desired information. In one embodiment, the IMS 140 forwards a response to the user indicating that a template does not exist for this situation, and prompts the user to create a new template using a template builder application. To create a new template the user can interact with the IMS 140 to provide situation information relating to the specific situation. This application allows the user to build a customized template that provides attributes required to produce a report of acceptable quality. The user opens the application and creates a new template based on the selected category. The description below of FIG. 4 provides one example of a process for creating a new template.

At step 20, either the existing template from step 16 or the new template created at step 18, can be transmitted or pushed from the IMS 140 to the computing device 130, located at a point-of-use within the specific work environment, where the computing device 130 can open the template which can be either the selected template (step 16), the similar existing template (step 42) or the new template (step 43).

At step 22, the processor 136 in the computing device 130 interprets this template to generate queries presented to the user for extracting desired information from the information. The user interface 134 displays a series of queries to the user. Each of the queries request user input by presenting the user with questions designed to extract the desired information corresponding to the specific situation. Because the templates can be designed using information collected from past work experiences within the same environment, these templates can be structured to extract relevant information in the situation at hand. For example, if an inspector inspects "part A," the IMS will provide a template which addresses information need during prior inspections of part A. In some cases, the questions which relate to the most important issue are presented first, the questions which relate to the second most important issue are presented second, etc. In one embodiment, the template presents the questions in the order the user encounters certain aspects of the specific situation. The most frequently occurring questions can be presented in order of relative priority.

In one embodiment, after either step 18 or step 20, for example, the computing device, possibly at the direction of the user, can send the new template to all databases in the IMS for use by other users. The IMS can push the new template to all users in the work environment.

At step 24, the user can input or enter responses to the queries to generate a completed template or "report" that includes the desired information. The completed template is generated based on the inputted responses which may only include the desired information. This information provided by the user might include, for example, user identification, work authorization, work location, project information, task, part information, job function, quantities, photographs, drawings or other images, equipment, unit, module, component or part identification, quantities, annotations associated with photographs or other images. The report may also include, for example, a photographic images, voice files, numerical information, text, and RF ID information. Optionally, the template may also include a section which allows the user to input free-form comments. Optionally, once the template is opened if can be stored locally on the user's computing device.

Once the user inputs all of the desired information into the template, the completed template can be presented to the user for approval. If the user does not approve the completed template, then the user can revise the template accordingly.

At step 26, if the user approves the content of the completed template, the user can transmit or upload the completed template to the IMS 140 to create a report. The completed template can be submitted to the IMS 140 over a wireless link and stored in the database 146.

EXAMPLE

To illustrate how this process might work in the context of an inspection process, one non-limiting example will now be described.

During an inspection process, a template can be provided to a portable tablet PC having 802.11 wireless networking capability. If the user or inspector identifies a problem as an "over sized drill hole" in a metal part, then a template which addresses that problem will be provided from the IMS 140. The portable tablet PC would interpret the template and present the user with a series of questions about the problem which vary depending on the context and possibly a blank space where he could enter a free-form text description of a problem. The inspector might be prompted to identify the size that the hole should be, the actual size of the hole, and a number which identified the hole on the part. By contrast, if the inspector identifies a problem as "corrosion" of a metal part, then a template which addresses that problem will be provided from the IMS 140. The portable tablet PC would interpret the template and present the user with a series of questions about the problem which vary depending on the context. For example, the inspector might be prompted to identify the severity of the corrosion, the area of the corrosion, and the location of the part. This process-based data collection process helps promote more consistent reporting of data so that problems are reported the same way every time.

FIG. 4 is a flowchart that shows an exemplary process for creating a new template. At step 40, situation information relating to the specific situation can be provided to the IMS 140. At step 41 it can be determined whether a similar template exists. If a similar template exists, then at step 42, based on the situation information, a similar existing template for a different situation can be selected which includes attributes similar to those of the specific situation. Based on this situation information, the IMS 140 determines attributes required to produce a report of sufficient quality for a user in that situation. If a similar template does not exist, then at step 43, the computing device 130 prompts the user to create a new template using the attributes of the existing template. The new template that is generated includes queries designed to extract the desired information for the specific situation. After steps 42 or 43, the process proceeds to step 20 of FIG. 3

Figure 5:
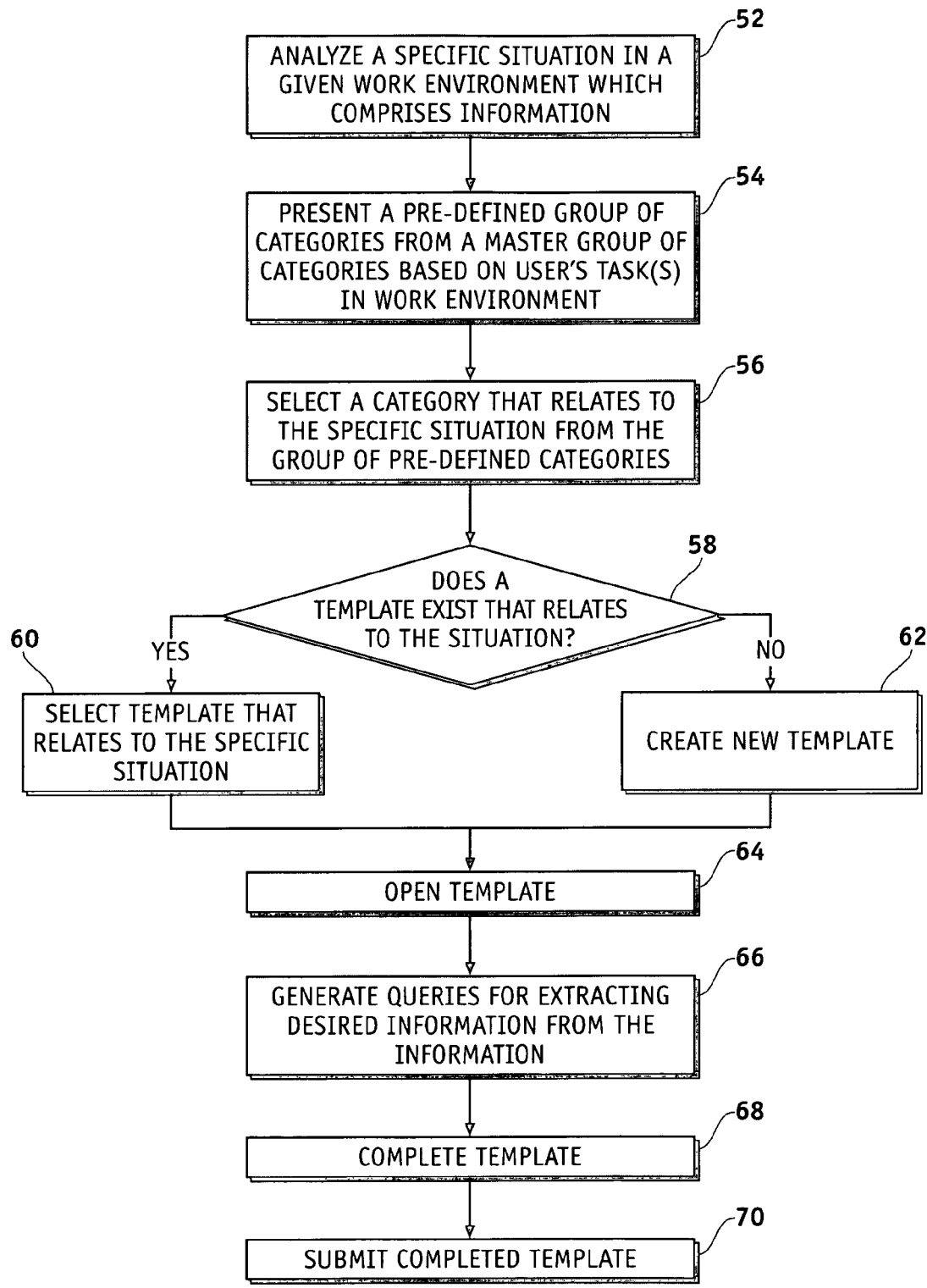
FIG. 5 is a flowchart that shows an information collection process according to another exemplary embodiment of the invention.

FIG. 5 is a flowchart showing an information collection process for efficiently collecting desired information from a point-of-use in a work environment and generating a report comprising the desired information.

At step 52, a mobile user analyzes a specific situation in the work environment that comprises information which includes extraneous information and the desired information.

At step 54, based on the mobile user's task(s) and/or point-of-use in the work environment, a pre-defined group of categories, selected from a master group of categories, can be presented to the mobile computing device of the user 130 from the IMS 140. A task generally relates to the user's point-of-use in a given work environment. The user interface 134 can display categories of information. The categories displayed vary dynamically depending on the work environment and possibly the user's specific tasks in the context of that work environment. Although not shown, the user may optionally identify a category which the specific situation applies to within that environment. As used herein, a "category" can be a unit of information which relates to the given work environment. At step 56, the mobile user selects a category that relates to the specific situation from the group of pre-defined categories. The computing device 130 then submits the information they deem relevant and possibly the selected category to the IMS 140 over a wireless link.

At step 58, the IMS 140 determines whether a specific template corresponding to the category exists within a plurality of templates stored in the database 146.

If it is determined that a specific template exists, then at step 60, the IMS 140 selects the specific template which matches up with the specific situation. The specific template requests user input comprising the desired information within the context of the specific situation.

If it is determined that the specific template does not exist, then at step 62, a new template can be generated which corresponds to the specific situation. This can be done in manner similar to that shown in FIG. 4.

In one embodiment, after either step 62 or step 64, for example, the computing device, possibly at the direction of the user, can send the new template to all databases in the IMS for use by other users. The IMS can push the new template to all users in the work environment.

Once the template corresponding to the specific situation is either selected (step 60) or created (step 62), then at step 64, the new template can be transmitted or pushed from the IMS 140 to the computing device 130 over the wireless link, where the computing device 130 can open the template. At step 66, the processor 135 interprets this template to generate queries for extracting desired information from the information.

These queries can be displayed on the user interface 134. At step 68, the user enters user input into the template, as prompted by queries or question in the template, to complete the template and generate a "report" relating to the category. As before, the user input includes the desired information. Once all desired information has been entered, then at step 70, the completed template or "report" can be transmitted to the database 146 where it is stored as a report.

Exemplary Use Cases

A few examples of applications or specific business processes in which the above systems and methods can be implemented to collect information related to the application or specific business process will now be described.

In one implementation, the template or series of templates can include questions which relate to a work order, and prompt the user to enter information such as their identity, passwords, the job the person is working on, and the specific task the user is performing in the context of that job.

Thus, techniques have been described which can help identify information a user requires for a specific task in a given work environment by providing the user with a template or series of templates designed to extract the desired information for that task. Each template can include, for example, queries or prompts to the user which are designed to extract the desired information for that task in the given work environment. In one implementation, when a series of templates or queries are provided to the user, a second template can be presented to the user based upon the user's response to a previous template or query. This tool can be implemented as part of a "process-based" collection process in that the specific collection process matches (or is consistent with) the user's specific task within the given work environment and the context of that given work environment. It can allow an enterprise to collect desired information, and optimize the collection of this desired information by using templates which leverage the user's cognitive process and experience in the given work environment in conjunction with other information sources.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks and modules described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof. Thus, the present invention is not intended to be limited to the embodiments shown herein but is to be accorded the widest scope consistent with the principles and novel features disclosed herein.

What is claimed is:

1. A method for collecting information, comprising:

receiving, from a user, an input that identifies a specific situation encountered by the user at a particular point-of-use within a work environment;

responsive to receiving the input, identifying, by a processor unit, a context for the specific situation encountered by the user, wherein the context is associated with a value in a list of values;

determining, by the processor unit, whether a template that matches the specific situation encountered by the user is stored in a database having a plurality of templates using the value associated with the context identified for the specific situation, wherein each template in the plurality of templates is associated with at least one value in the list of values;

responsive to a determination that a template that matches the specific situation encountered by the user is stored in the database, selecting, by the processor unit, the template that matches the specific situation and opening the template at a computing device at the particular point-of-use;

responsive to a determination that the template that matches the specific situation encountered by the user is not stored in the database, dynamically creating the template that matches the specific situation encountered by the user prior to opening the template at the computing device at the particular point-of-use;

interpreting, by the computing device at the particular point-of-use, the template to generate queries presented to the user, wherein the queries are designed to extract desired information from information related to the specific situation, the information related to the specific situation including the desired information and extraneous information, wherein the specific situation is encountered by the user during an analysis project, and wherein the desired information relates to a task performed by the user as part of the analysis project;

the computing device at the particular point-of-use receiving from the user, responses to the queries, the responses including the desired information;

the computing device at the particular point-of-use generating a completed template including the desired information based on the responses; and the computing device at the particular point-of-use submitting the completed template to an information management system.

2. The method of claim 1, further comprising:
storing the completed template in the database.

3. The method of claim 1, wherein creating the template that matches the specific situation encountered by the user, comprises:

providing situation information relating to the specific situation encountered by the user to the information management system;

determining from the provided situation information whether a similar template exists that has attributes similar to attributes needed in the specific situation is stored in the database;

responsive to a determination that the similar template is stored in the database, selecting the similar template to form a created template.

4. An interface system for guiding a user through an information collection process designed to collect desired information specific to a given task encountered by the user at a particular point-of-use within work environment, the system comprising:

a template generation unit configured to receive, from the user, an input that identifies the given task encountered by the user at the particular point-of-use within the work environment, identify a context for the given task encountered by the user, wherein the context is associated with a value in a list of values, determine whether a template that matches the given task encountered by the user at the particular point-of-use within the work environment is stored in a database having a plurality of templates using the value associated with the context identified for the given task, wherein each template in the plurality of templates is associated with at least one value in the list of values, responsive to a determination that the template that matches the given task encountered by the user is stored in the database, open the template at a computing device at the particular point-of-use, and responsive to a determination that that the template that matches the given task encountered by the user is not stored in the database, dynamically create the template that matches the given task encountered by the user prior to opening the template at the computing device at the particular point-of-use, wherein the given task is encountered by the user during an analysis project, and wherein the desired information relates to a task performed by the user as part of the analysis project; and a computer configured to execute the template to guide the user through the information collection process by extracting desired information from the user which satisfies data inputs required to complete the given task encountered by the user at the particular point-of-use within the work environment, wherein executing the template comprises interpreting the template to generate queries presented to the user, wherein the queries are designed to extract the desired information which satisfies the data inputs required to complete the given task, wherein the computer receives responses to the queries from the user, the responses including the desired information, wherein the computer generates a completed template including the desired information based on the responses received, and wherein the computer submits the completed template to an information management system.

5. The system of claim 4,
wherein the database is configured to store the desired information, and wherein the database is accessible by other users to assist during other information collection tasks of the other users.

6. The system of claim 4, wherein the template comprises a connecting mechanism for connecting the user to an external data source, the external data source providing data to the user to assist the user in providing the data inputs for the given task encountered by the user at the particular point-of-use within the work environment.

7. A system for guiding a user to perform a desired task encountered by the user at a particular point-of-use within work environment, the system comprising:

a template generation unit configured to receive, from the user, an input that identifies the desired task encountered by the user at the particular point-of-use within the work environment, identify a context for the desired task encountered by the user, wherein the context is associated with a value in a list of values, determine whether a template that matches the desired task encountered by the user at the particular point-of-use within the work environment is stored in a database having a plurality of templates using the value associated with the context identified for the desired task, wherein each template in the plurality of templates is associated with at least one value in the list of values, wherein the template is designed to extract desired information that the user encounters while performing the task encountered by the user at the particular point-of-use within the work environment, responsive to a determination that the template that matches the desired task encountered by the user is stored in the database, open the template at a computing device at the particular point-of-use, and responsive to a determination that that the template that matches the desired task encountered by the user is not stored in the database, dynamically create the template that matches the desired task encountered by the user prior to opening the template at the computing device at the particular point-of-use, wherein the desired task is encountered by the user during an analysis project, and wherein the desired information relates to a task performed by the user as part of the analysis project; and a computer configured to execute the template to guide the user to collect the desired information while performing the desired task encountered by the user at the particular point-of-use within the work environment, guide the user through the information collection process by extracting desired information from the user which satisfies data inputs required to complete the desired task encountered by the user at the particular point-of-use, wherein executing the template comprises interpreting the template to generate queries presented to the user, wherein the queries are designed to extract the desired information which satisfies the data inputs required to complete the desired task, wherein the computer receives responses to the queries from the user, the responses including the desired information, wherein the computer generates a completed template including the desired information based on the responses received, and wherein the computer submits the completed template to an information management system.

8. The system of claim 7,
wherein the database is configured to store the desired information, and wherein the database is accessible by other users to assist the other users during performing tasks similar to the desired task.

9. The method of claim 1, wherein the desired information relates to findings used to characterize the specific situation that is encountered by the user at the particular point-of-use.

10. The method of claim 1, wherein the desired information relates to findings used to resolve the specific situation that is encountered by the user at the particular point-of-use.

11. The method of claim 1, wherein the desired information relates to a task performed by the user as part of an analysis project in a maintenance process.

12. The method of claim 1, wherein the desired information relates to a task performed by the user as part of a manufacturing process.

13. The method of claim 3, further comprising:
responsive to a determination that a similar template is not stored in the database, generating a new template using the attributes needed in the specific situation to form the created template.

* * * * *